Patented Dec. 11, 1945

2,390,911

UNITED STATES PATENT OFFICE 2,390,911

INSECTICIDE AND METHOD OF MAKING SAME

Thomas C. Allen and Herbert H. Harris, Madison, Wis., assignors to Wisconsin Alumni Research Foundation, Madison, Wis., a corporation of Wisconsin No Drawing. Application August 3, 1942, Serial No. 453,420

5 Claims. (Cl. 167—24)

This invention relates to an insecticide and to the method of preparing the same. It has special reference to an insecticide which, when used in liquid form for spraying, is specially toxic to houseflies.

One object is to provide an insecticide which is highly toxic to insects, especially to houseflies, and which is more effective and less expensive to produce than the present forms of commercial insecticides.

A further object is to utilize a plant material which is available or can readily be grown within the United States, but which in its natural state is normally either non-toxic or insufficiently toxic for commercial insecticide purposes.

A further object is to convert an otherwise insufficiently toxic plant material into a highly toxic product for use as the toxic ingredient of an insecticide for insects, particularly houseflies.

This insecticide is composed primarily of the seed of the sabadilla plant which, in accordance with our invention, is greatly enhanced or increased in toxicity over the natural state of the seed. It may be used either as a dry powder for insecticidal purposes or in a suitable solvent or vehicle as a spray type insecticide.

Our investigations have resulted in the discovery that the sabadilla plant, and particularly the seed thereof, has toxic properties which are not in the natural state of the plant sufficiently potent to insects to make a suitable commercial insecticide, but which are activated or rendered highly potent by the application of heat.

The sabadilla seed of commerce is principally derived from plants of the Schoenocaulon genus, tribe, Veratreae, family *Liliaceae*, of which over thirteen species have been described. Of these species, the *Schoenocaulon officinale*, (Schlect. and Cham.) A. Gray, is the principal source of commercial sabadilla seed. The *Schoenocaulon officinale* has been collected in Mexico, Guatemala, Honduras and Venezuela, while another species *Schoenocaulon Drumondii*, A. Gray, is prevalent in the United States, and has been found by us to be most satisfactory in possessing the active principle which is toxic to insects.

While other portions of the plant, such as the spikes, have been found to be toxic to some degree, it is not sufficient to provide a commercial source, and our work has shown that the seed of the plant is the principal source of active ingredients.

We have also found that the toxicity of the sabadilla seed in the natural state of different species varies greatly, some being practically non-toxic and others being in some instances somewhat toxic, but in no case sufficient to meet the requirement of the standards generally recognized for commercial insecticides. This wide range of variation exists also in the seed of the same species. These differences are presumably due to such factors as age and storage of the seed and methods of harvest, and possibly environmental conditions associated with the wide floral range of the plant.

We have discovered that the application of heat to the ground or powdered seed increases or renders active to a high degree the potency of the toxic ingredients irrespective of the degree of the toxicity before treatment. As a result of heat treatment, the seed of the various species and of various batches of the same species can be brought up to a substantially uniform level of toxicity, higher than the degree of toxicity found in any of the species in the normal state. This is extremely important from a commercial standpoint because it enables the insecticide producers to utilize all of the available sabadilla seed, without regard to the natural toxic properties and without the necessity of testing or selecting toxic species. Furthermore, the level of toxicity to which our invention raises the seed provides a product which is effective to meet and surpass the degree of toxicity required for commercial insecticides.

In carrying out our invention, the seed is finely powdered or ground or comminuted, and then heated sufficiently above normal temperature and for a sufficient period of time to develop or enhance the toxic potency to its maximum, and then allowed to cool down to normal temperature. We have found a temperature of about 150° C. for a period of about one hour to be most effective. Any increase in temperature of the powdered seed in relation to time above usual or normal temperature activates or enhances the toxicity of the material, and the degree of increase or enhancement becomes greater as the temperatures approach about 150° C. in relation to a time period of about one hour. On the other hand, temperatures beyond about 150° C., even though the time may be varied, appear to have the effect of either not appreciably increasing the toxicity or destroying it. However, since our invention is primarily the discovery that the application of heat above normal temperature enhances the degree or level of the toxicity of the powdered seed, it is readily determinable, without experiment, what temperatures are most effective to produce the desired maximum results in any case of particular batches of seed or species of plant being treated.

The application of heat to the powdered seed may be accomplished generally in two ways and with any suitable apparatus. If the material is to be used as an insecticide in dry or dusting powder form, then the powder itself can be heated in a suitable chamber and allowed to cool, after which it is ready for use. On the other hand, if the material is to be used as the toxic ingredient of a liquid or spray type of insecticide, the powdered seed is mixed with a solvent or vehicle such as kerosene, and the mixture heated to the desired degree and for the proper length of time. The extract thus formed is then filtered either hot or cooled. Any of the solvents, such as petroleum hydrocarbon of the kerosene type, commonly used for commercial spray insecticides, may be used as a solvent or vehicle for the powdered sabadilla seed.

The treatment of sabadilla seed by heat, in accordance with our invention, develops the toxicity thereof to the extent that a toxic material is provided which, in the proportion of one-half pound of powdered seed to one gallon of solvent, forms an insecticide for houseflies which greatly exceeds the standard requirements of the National Association of Insecticide and Disinfectant Manufacturers' Official Test Insecticide for a highly toxic spray insecticide.

In the commercial manufacture of spray insecticides, it is desirable to produce concentrated extracts which are afterwards diluted for use. In this event, the pre-heated dry powdered seed can be added in larger quantity, say nine or ten pounds to a gallon of solvent at normal temperature, or the unheated powder in such quantity mixed with a gallon of solvent and the mixture heated as above described. The mixture under either of these conditions can then be expressed at high pressure. The resulting concentrated extract is then diluted with solvent to the proportion of one-half to one pound of the original powdered seed per gallon of solvent, and this dilution is commercially effective as a fly spray.

We claim:

1. The method of increasing the toxicity of sabadilla seed to houseflies over the natural toxicity thereof, which consists in comminuting the seed and heating the comminuted seed in a solvent of kerosene to a temperature sufficiently above normal temperature and for a sufficient period of time to develop maximum toxicity.

2. The method of making an insecticide toxic to houseflies which consists in heating powdered sabadilla seed in a solvent to a temperature of about 150° C. for a period of approximately one hour.

3. The method of enhancing the toxic potency of sabadilla seed to houseflies over the natural toxicity thereof, which consists in comminuting the seed and extracting the active principle thereof in a solvent at a temperature of approximately 150° C. for a period of approximately one hour and agitating said seed and solvent during said extraction.

4. As an insecticide powdered sabadilla seed, the toxicity to insects of which is greater than that of the natural seed by having been heated above normal temperature for a period of time sufficient to develop maximum toxicity.

5. As an insecticide powdered sabadilla seed, the toxicity to insects of which is greater than that of the natural seed by having been heated to a temperature of about 150° C. for about one hour.

THOMAS C. ALLEN.
HERBERT H. HARRIS.